Figure 1:
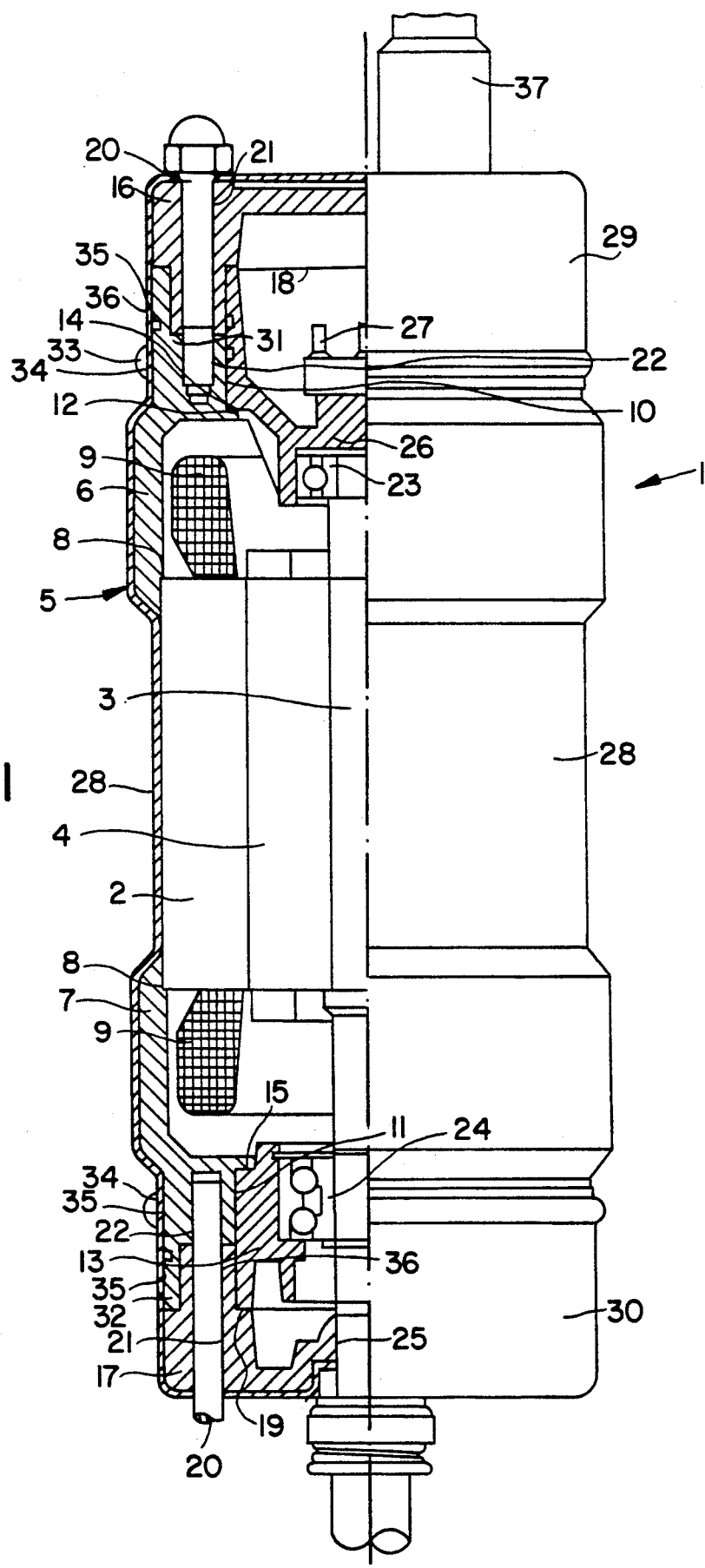

United States Patent [19]

Blum et al.

[11] Patent Number: 5,113,103

[45] Date of Patent: May 12, 1992

[54] ELECTRIC MOTOR

[76] Inventors: Albert Blum, Scheiderhöhe, 5204 Lohmar 1; Günter Krämer, Lothar-Irle-Str. 18, 5900 Siegen 1 (Kaan), both of Fed. Rep. of Germany

[21] Appl. No.: 466,251
[22] PCT Filed: Oct. 13, 1988
[86] PCT No.: PCT/DE88/00631
 § 371 Date: Apr. 5, 1990
 § 102(e) Date: Apr. 5, 1990
[87] PCT Pub. No.: WO89/04079
 PCT Pub. Date: May 5, 1989

[30] Foreign Application Priority Data

Oct. 26, 1987 [DE] Fed. Rep. of Germany ....... 3736159

[51] Int. Cl.$^5$ .............................................. H02K 5/00
[52] U.S. Cl. ........................................ 310/89; 310/42; 310/54; 310/88; 310/90; 310/91; 310/258
[58] Field of Search ................. 310/254, 258, 42, 87, 310/88, 54, 89, 91, 90; 29/596; 384/185, 295, 428, 434, 439

[56] References Cited

U.S. PATENT DOCUMENTS

| | | | |
|---|---|---|---|
| 2,462,204 | 2/1949 | Ludwig | 310/90 U X |
| 3,143,897 | 8/1964 | Kohn | 310/89 U X |
| 3,289,018 | 11/1966 | Schaefer | 310/42 |
| 3,382,383 | 5/1968 | Turk | 310/86 |
| 3,433,990 | 3/1969 | Stone | 310/89 |
| 3,707,038 | 12/1972 | Hallerback | 29/596 |
| 3,760,209 | 9/1973 | Hult | 310/90 |
| 3,873,861 | 3/1975 | Halm | 310/42 |
| 4,780,953 | 11/1988 | Wheeler | 310/87 |

FOREIGN PATENT DOCUMENTS

| | | |
|---|---|---|
| 1728181 | 2/1972 | Fed. Rep. of Germany . |
| 2904384 | 8/1979 | Fed. Rep. of Germany ... 310/89 U X |
| 1093496 | 5/1955 | France . |
| 2042280 | 9/1980 | United Kingdom ......... 310/89 U X |

Primary Examiner—R. Skudy
Attorney, Agent, or Firm—Brooks & Kushman

[57] ABSTRACT

An electric motor (1) comprises a housing (5) which encloses it tightly and consists of a stainless steel sheet jacket (28), a stator (2), a shaft (3) which is passed out of the housing, and two centering pieces (6, 7) arranged on both sides of the stator (2), which abut the end faces of the stator (2) and in which the shaft (3) is mounted. In such a motor (1) the housing (5) is required, while retaining the known advantages, to withstand high mechanical stresses and moreover to be capable of being produced for a small outlay. To this end the centering pieces (6, 7) are of thick-walled construction, preferably of cast material, and the outside diameter on the side facing the stator (2) is greater than that of the stator, the centering pieces (6, 7) embracing the stator (2) positively. The end sections (31, 32) of the centering pieces (6, 7) remote from the stator (2) exhibit at least one constriction, and the sheet metal jacket (28) closely abuts the region of the stator (2) which is exposed between the two centering pieces (6, 7), and the two centering pieces (6, 7), at least into the constriction.

13 Claims, 3 Drawing Sheets

ELECTRIC MOTOR

The invention relates to an electric motor having a housing which encloses it tightly and consists of a stainless steel sheet jacket, a stator maintained integrally in rotation in the housing, a shaft, at least one end of which is passed out of the housing, two centring pieces arranged on both sides of the stator, which abut a stop at the end faces of the stator and in which the shaft is mounted directly or indirectly.

In a known electric motor of the type stated (DE-PS 2,904,384) all the parts which form the housing consist of relatively thin sheet metal. Screw threads which fit into the corresponding screw thread of the next housing part are turned or curled into the ends of housing parts to be mutually connected.

However, thin sheet metal housings are inadequate for large motors, particularly if the housings are also to be used in underwear operations. When the motor housings are connected to heavy pumps considerable mechanical tensile, compressive and flexural forces occur, which have to be absorbed solely by the housing. Moreover, the housings have to be protected from increased internal pressure and external pressure. Thin sheet steel housings are not suitable for this purpose.

The underlying object of the invention is to produce an electric motor, the housing of which, whilst retaining the advantage of the known housings, can withstand high mechanical stresses and moreover can be produced for a small outlay.

This object is achieved according to the invention in that the centring pieces are of thick-walled construction, that the outside diameter of the centring pieces on the side facing the stator is greater than that of the stator, that the centring pieces embraces the stator positively at its end faces, that the outer end sections of the centring pieces remote from the stator exhibit at least one constriction, and that the sheet metal jacket closely abuts the region of the stator which is exposed between the two centring pieces, and the two centring pieces, at least into the constriction.

The thick-walled centring pieces, which preferably consist of cast iron and which engage both sides of the stator give the motor the same mechanical strength and load capacity in the critical regions as for a motor having a continuous stable cast housing. The motor is moreover covered with an external layer of stainless sheet steel, so that it is protected from corrosion and may also be immersed in corrosive liquids for example.

Due to the particular construction of the centring pieces it is possible for the sheet metal jacket when applied to fix the components of the motor relatively to each other without additional auxiliary means.

The constriction of the centring pieces may be formed by the outer end sections of the centring pieces being reduced in diameter. In this case the sheet metal jacket may be applied to the stator and the centring pieces by the pressure rolling process, so that the sheet metal jacket closely abuts the stator and the centring pieces along its total length, so that good heat transfer exists from the inside outwards and intensive heat dissipation is thus ensured.

Instead of the pressure rolling process, the calibration process or swaging process may also be used to apply the jacket on to the stator and the centring pieces.

The two end faces of the motor may be sealed by end caps made of stainless sheet steel which embrace the sheet metal jacket tightly. For sealing purposes the sheet metal caps exhibit an outward pressed all-round bead, into which an O-ring is inserted, in their section which embraces the sheet metal jacket.

Separate bearing brackets may be inserted into the centring pieces to mount the shaft. Sealing pieces may be screwed onto the outward facing end faces of thee centring pieces, the bearing bracket being fixed between shoulders on the centring pieces on the one hand and the sealing pieces on the other hand.

However, it is also possible alternatively for the centring pieces to be integral with the bearing brackets.

In another exemplary embodiment the constriction of the centring pieces may be formed by an all-round groove into which the sheet metal jacket is rolled.

In order to seal the end caps an O-ring which abuts the smooth inside of the respective end cap may be inserted into the respective all-round groove over the rolled-in sheet metal jacket.

The centring pieces may exhibit a second all-round groove, into which the sheet metal jacket is rolled, in the region between the all-round groove and the end which abuts the stator. This further increases the mechanical stability of the motor. An O-ring which abuts the internal surface of an applied cooling jacket may be inserted into said second groove over the sheet metal jacket.

The outer sheet metal jacket may be a preformed tube, which is welded seamlessly or with a longitudinal seam or may also be deep-drawn or pressed out of a disc. The preformed tube fits positively over the centring pieces and the jacket regions are rolled in or curled in over the stator and the constrictions.

Oil-cooled motors may be constructed so that a bead is curled into the jacket region over the stator only immediately adjacent to each of the two centring pieces, whereas the jacket section between the two beads remains unformed.

Figure 2:
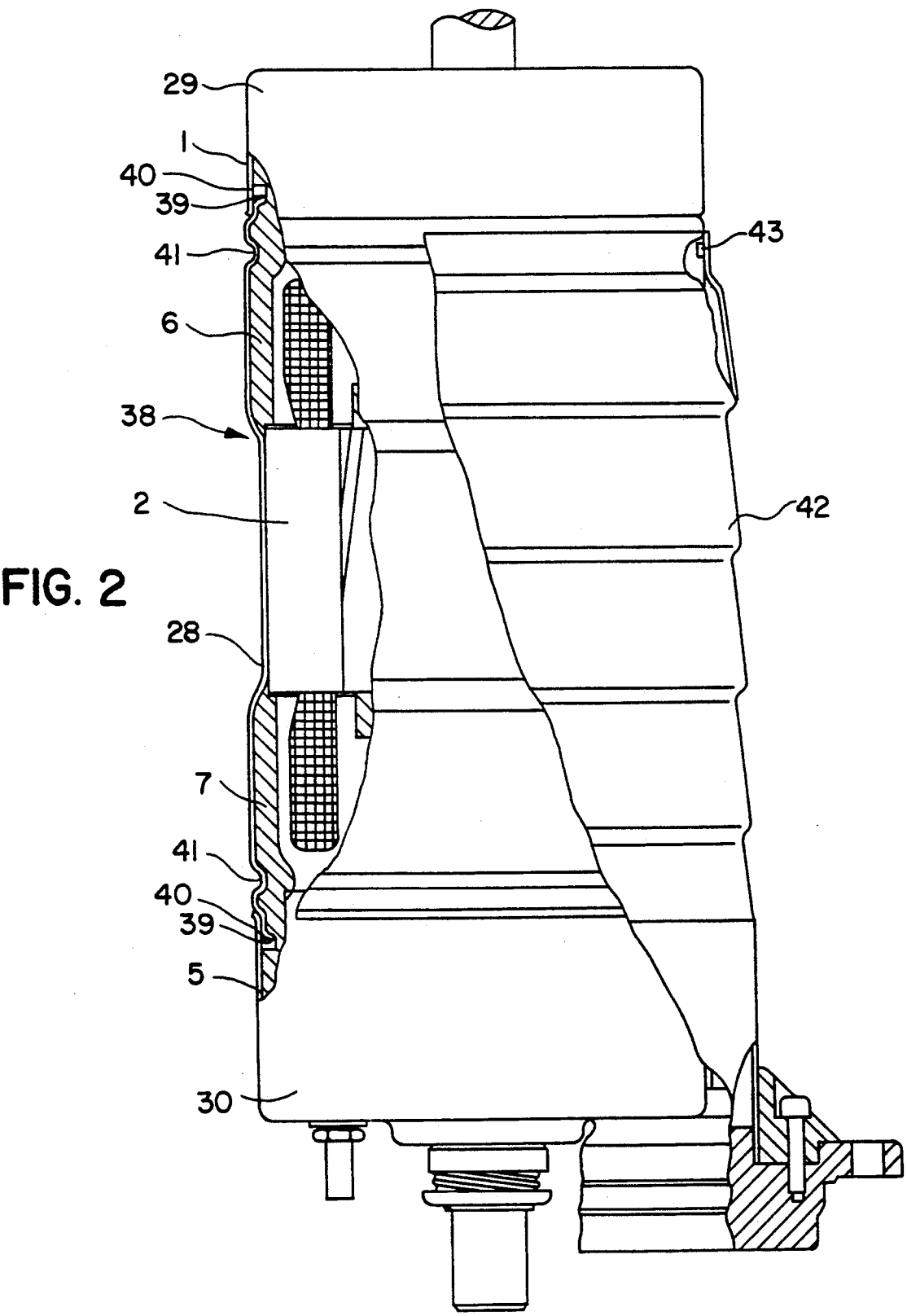
Figure 3:
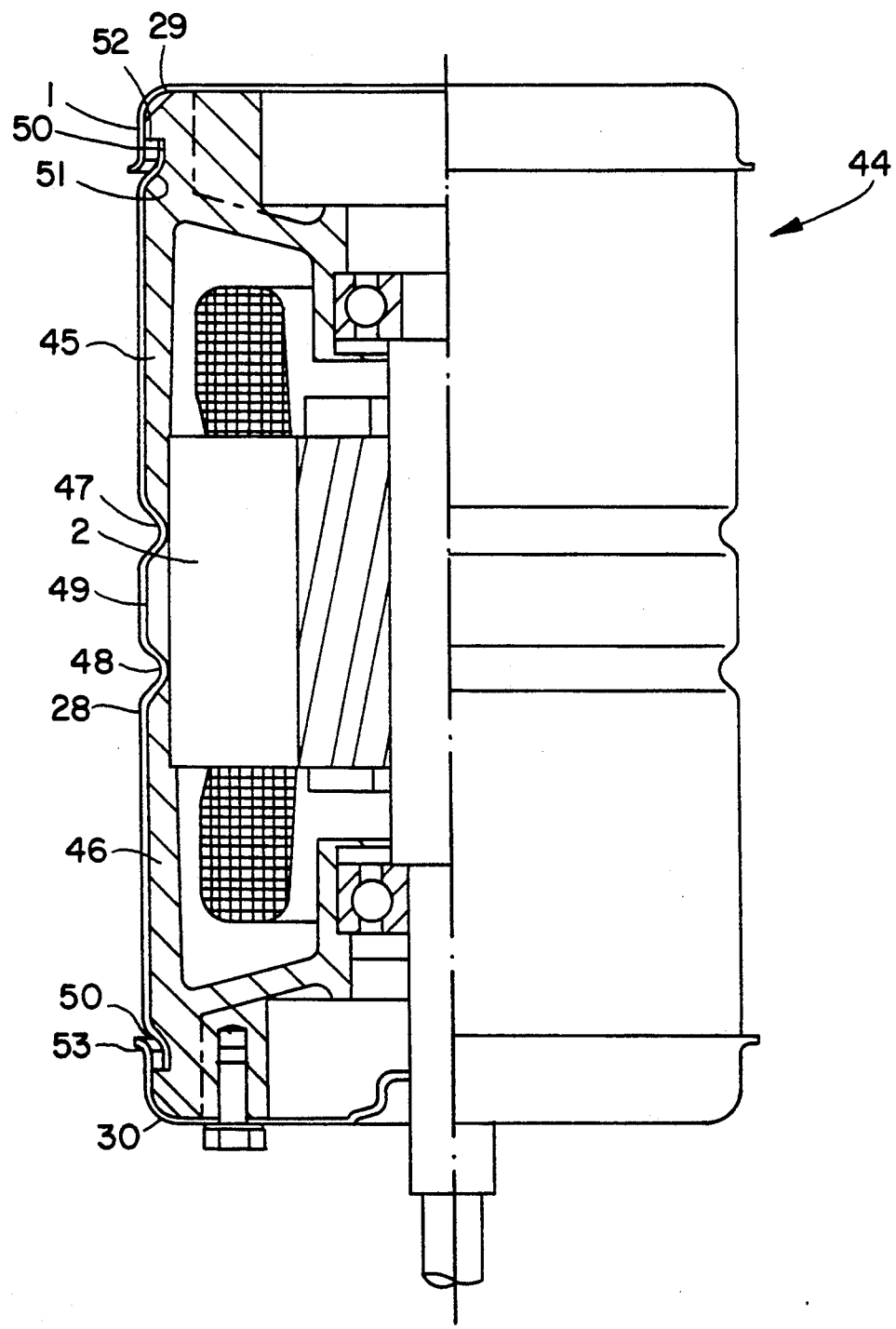

The invention is illustrated by way of example in the drawing and described more fully below with reference to the drawing, in which FIG. 1 shows in elevation an exemplary embodiment of an electric motor, partly sectioned, FIG. 2 shows in elevation another exemplary embodiment of an electric motor, partly sectioned, and FIG. 3 shows in elevation a further exemplary embodiment of an electric motor, partly sectioned.

The electric motor 1 illustrated in FIG. 1 substantially comprises a stator 2, a rotor 4 mounted rotatably relative to the latter and mounted on a shaft 3, and a housing 5 tightly enclosing the motor.

Centring pieces 6 and 7, the outside diameter of which is greater than that of the stator 2, are arranged at both ends of the stator 2. The centring pieces 6 and 7 are provided at the end facing the stator 2 with a shoulder 8 with which they embrace positively the respective end face of the stator 2. The stator 2 is thus aligned reliably relative to the centring pieces 6 and 7.

The centring pieces 6 and 7, which consist of relatively thick-walled material, are of pot-shaped construction at their ends facing the stator and embrace the head-shaped winding ends 9 with an interval.

The centring pieces 6 and 7 are provided in their central region with large bores 10 and 11 respectively, into which separate bearing brackets 12 and 13 respectively are inserted.

The bearing brackets 12 and 13 abut shoulders 14 and 15 respectively of the centring pieces 6 and 7 respectively in the axial direction facing towards the stator.

Outer sealing pieces 16 and 17 respectively are screwed onto the outward facing end faces of the centring pieces 6 and 7; their outside diameter corresponds to that of the centring pieces and they each press with a shoulder 18 and 19 respectively against the outward facing end faces of the bearing brackets 12 and 13 respectively, so that the bearing brackets are fixed between the shoulders 14 and 15 respectively of the centring pieces on the one hand and the shoulders 18 and 19 respectively of the sealing pieces 16 and 17 respectively on the other hand.

Set bolts 20, which engage through bores 21 in the sealing pieces 16 and 17 respectively and are screwed into screw-threaded bores 22 in the centring pieces 6 and 7 respectively, serve to fasten the sealing pieces 16 and 17 respectively to the centring pieces 6 and 7 respectively.

The motor shaft 3 is mounted in the bearing brackets 12 and 13 respectively by rolling-contact bearings 23 and 24 respectively.

On the side of the motor which faces downwards in FIG. 1, the shaft projects through bore 25 provided in the outer sealing piece 17 and is passed out fluid-tightly.

On the opposite side the shaft end terminates inside the housing, namely at a short interval from a base 26 of the bearing bracket 12. The base 26 of the bearing bracket 12 serves simultaneously as a support means for the electrical terminal 27 of the windings.

The housing 5, which tightly encloses the entire electric motor, comprises a jacket 28 made of stainless sheet steel and caps 29 and 30, likewise made of stainless sheet steel, which embraces the sheet metal jacket 28 tightly on both sides (FIG. 2).

The sheet metal jacket 28 is first of all placed over the centring pieces 6 and 7 as a prefabricated tube. Because they exhibit a greater diameter than the stator 2, an interstice exists between the stator and the sheet metal jacket at first. This is eliminated by pressing the sheet metal jacket flush onto the stator in the region between the mutually facing ends of the centring pieces 6 and 7 by the pressure rolling process.

The outer end sections 31 and 32 of the centring pieces 6 and 7 respectively which are remote from the stator 2 are reduced in diameter so that the sheet metal jacket is located at an interval above these reduced regions. After the central region of the sheet metal jacket 28 has been rolled onto the stator 2, the end sections of the jacket 28 are also pressed against the thinner end sections 31 and 32 of the centring pieces by the same process. Excellent fixing of the components relative to each other is obtained by the sheet metal jacket 28 in this manner. After this the caps 29 and 30 are placed and embrace the pressed ends of the sheet metal jacket positively. For sealing purposes the sheet metal caps 29 and 30 exhibit an outward pressed all-round bead 33, into which an O-ring 34 is inserted, in their section which embraces the sheet metal jacket 28. For additional sealing, all-round grooves 35, into each of which an O-ring 36 is inserted for additional sealing, are provided in the outer surfaces of the centring pieces 6 and 7 in the region which faces the sheet metal caps 29 and 30.

Additional seals are provided between the bearing brackets 12 and 13 and the centring pieces 6 and 7 on the one hand and the sealing pieces 16 and 17 on the other hand. Seals are also arranged all round the passage regions of the set bolts 20.

The electrical lead 37 is passed fluid-tightly through the sheet metal cap 29 and the sealing piece 16.

The electric motor 38 shown in FIG. 2 is constructed similarly to the motor 1 in the exemplary embodiment shown in FIG. 1. Identical parts are therefore designated by the same reference numerals.

However, the centring pieces 6 and 7 which abut the stator 2 exhibit a somewhat different shape. The centring pieces are provided at an interval from their end which abuts the stator 2 with an all-round groove 39 into which the sheet metal jacket 28 is rolled. The function of the all-round grooves corresponds approximately to the end sections 31 and 32, provided with a reduced cross-section, of the centring pieces shown in FIG. 1. The axial cohesion of the motor parts is ensured by rolling the sheet metal jacket 28 into the all-round grooves 39. O-rings 40 which are inserted into the all-round grooves 39 form a seal element relative to the caps 29 and 30 fitted on both sides. In this exemplary embodiment the ends of the caps 29 and 30 which are fitted onto the centring pieces are of smooth cylindrical construction, whilst the O-rings 40 abut the insides of the cylindrical cap ends.

The centring pieces 6 and 7 are provided with a further all-round groove 41 in the region between the all-round groove 39 and the rotor 2 into which the sheet metal jacket 28 is rolled. The axial cohesion is improved by this further groove. This second all-round groove 41 also has a further function. In the exemplary embodiment shown in FIG. 2 the central region of the motor is enclosed by a cooling jacket 42 made of stainless sheet steel. As shown in the upper region of FIG. 2, an O-ring 43 may be inserted into the all-round groove 41, whereby the edge of the cooling jacket 42 can be sealed relative to the motor housing.

The electric motor 44 shown in FIG. 3 relates to an exemplary embodiment with an oil cooling system. The two centring pieces 45 and 46 which abut the stator 2 are constructed integrally with the bearing brackets. The two centring pieces 45 and 46 are identical and are fitted in opposite positions to each other.

The sheet metal jacket 28, as a preformed tube, is fitted positively over the centring pieces 45 and 46 and, from outside, a bead 47 or 48 respectively is curled in over the stator 2 only in the region directly adjacent to the two centring pieces 45 and 46, the jacket section 49 between the two beads 47 and 48 being left substantially unformed. An interstice into which cooling oil can penetrate is provided between the sheet metal jacket 28 and the stator 2 in this region.

The axial cohesion of the individual parts of the motor is effected by rolling the sheet metal jacket into all-round grooves 50 which are turned into the outer circumference of the centring pieces 45 and 46 just before their outer ends. The grooves 50 are provided with a bevel 51 on the side facing the stator 2, so that the sheet metal jacket 28 can be rolled into the groove easily. The other side of the groove exhibits a wall 52 extending at right angles to the axis of the centring pieces, which forms a sharp edge together with the outer circumferential surface of the centring pieces. This edge co-operates with a cutting roller when the sheet metal jacket 28 is applied, so that the sheet metal jacket is cut to length simultaneously.

O-rings 53, which are inserted into the all-round grooves 50, seal the end caps 29 and 30 respectively relative to the centring pieces 45 and 46 respectively.

I claim:

1. Electric motor (1; 38; 44) having two end faces and having a housing which embraces the motor tightly and consists of a sheet metal jacket (28), a stator (2) maintained fixedly in the housing (5), a shaft (3), at least one end of which passes out of the housing (5), and two centering pieces (6, 7; 45, 46) arranged on both sides of the stator (2), which have an outside diameter on a side facing the stator (2) which is greater than the stator (2), which embrace the stator (2) positively at its end faces, which abut a stop at the end faces of the stator (2) and which are formed for mounting the shaft, characterized in that the sheet metal jacket (28) consists of stainless steel, that the centering pieces (6, 7; 45, 46) are of thick-walled construction and include outer end sections remote from the stator (2) and which exhibit at least one constriction, that the sheet metal jacket (28) closely abuts a region of the stator (2) which is exposed between the two centering pieces, and the two centering and bearing brackets are inserted into the centering pieces to mount the shaft pieces (6, 7; 45, 46), and that the sheet metal jacket tightly, engages the constriction, and that the two end faces of the motor (1; 38; 44) are sealed by end caps (29, 30) made of stainless steel which embrace the sheet metal jacket (28) tightly.

2. Electric motor according to claim 1, characterized in that the constriction of the centering pieces (6, 7) is formed by the outer end sections (31, 32) of the centering pieces being reduced in diameter.

3. Electric motor according to claim 1 or 2, characterized in that the sheet metal jacket (28) is applied to the stator (2) and the centering pieces (6, 7) by pressure rolling.

4. Electric motor according to claim 1 or 2, characterized in that the end caps (29, 30) exhibit an outward pressed all-round bead (33), into which an O-ring (34) is inserted, in their section which embraces the sheet metal jacket (28).

5. Electric motor according to claim 2, characterized in that the bearing brackets (12, 13) are separate and are inserted into the centering pieces (6, 7), to mount the shaft (3).

6. Electric motor according to claim 1, characterized in that sealing pieces (16, 17) are screwed onto outward facing end faces of the centering pieces (6, 7) and that the bearing brackets (12, 13) are fixed between shoulders (14, 15) on the centering pieces (6, 7) and the sealing pieces (16, 17).

7. Electric motor according to claim 1, characterized in that the constriction of the centering pieces (6, 7; 45, 46) is formed by an all-round groove (39; 50) into which the sheet metal jacket (28) is rolled.

8. Electric motor according to claim 7, characterized in that an O-Ring (45; 53) abuts a smooth inside surface of each end cap (29, 30) and is inserted into the all-round groove (39; 50) over the sheet metal jacket (28).

9. Electric motor according to claim 7 or 8, characterized in that the centering pieces (6, 7) exhibit a second all-round groove (41), into which the sheet metal jacket (28) is rolled between the all-round groove (39) and an end which abuts the stator (2), and that an O-ring (43) which abuts an internal surface of a cooling jacket (42) is inserted into said groove (41) over the sheet metal jacket.

10. Electric motor according to claim 1, 2, 5, 6, 7 or 8, characterized in that the sheet metal jacket (28) is a preformed tube which fits positively over the centering pieces (45, 46) and that portions of the sheet metal jacket are rolled in over the stator (2) and the constriction.

11. Electric motor according to claim 10 having an oil cooling system, characterized in that a bead (47, 48) is curled in a portion of the sheet metal jacket over the stator (2) only immediately adjacent to each of the two centering pieces (45, 46), whereas another portion (49) of the sheet metal jacket between the two beads is unformed.

12. Electric motor according to claim 1, characterized in that the constriction of the centering pieces (6, 7; 45, 46) is formed by an all-round groove (39; 50) into which the sheet metal jacket (28) is curled.

13. Electric motor according to claim 1, 2, 5, 6, 7 or 8, characterized in that the sheet metal jacket (28) is a preformed tube which fits positively over the centering pieces (45, 46) and that portions of the sheet metal jacket are curled over the stator (2) and the constriction.

* * * * *